Figure 1:
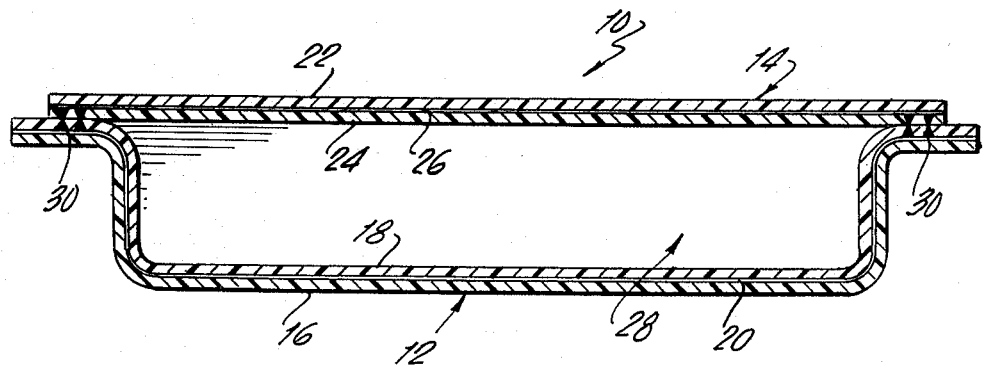

United States Patent [19]

Hirsch et al.

[11] 3,997,677

[45] Dec. 14, 1976

[54] HIGH TEMPERATURE RESISTANT HERMETICALLY SEALED PLASTIC TRAY PACKAGES

[75] Inventors: Arthur Hirsch, Elizabeth; Francis X. Spiegel, Cedar Grove, both of N.J.

[73] Assignee: Standard Packaging Corporation, New York, N.Y.

[22] Filed: Feb. 7, 1975

[21] Appl. No.: 547,772

Related U.S. Application Data

[63] Continuation-in-part of Ser. No. 251,711, May 9, 1972, abandoned.

[52] U.S. Cl. .............................. 426/113; 206/484; 229/43; 229/DIG. 14; 426/118; 426/127; 426/396; 426/412; 428/412; 428/419; 428/500
[51] Int. Cl.² ........................................ B65B 25/22
[58] Field of Search ......... 426/113, 114, 127, 396, 426/398, 401, 412, 45; 215/1 C; 229/3.5, 2.5 R; 206/484; 220/63 R, 64, 65, 43; 229/43; 428/412, 35, 419, 500

[56] References Cited

UNITED STATES PATENTS

| | | | |
|---|---|---|---|
| 2,951,765 | 9/1960 | Robson | 426/113 |
| 3,017,302 | 1/1962 | Hultkrans | 229/53.3 |
| 3,298,559 | 1/1967 | Lurie | 229/3.5 MF |
| 3,454,210 | 7/1969 | Spiegel et al. | 229/43 |
| 3,531,300 | 9/1970 | Greenberg | 426/232 |
| 3,547,338 | 12/1970 | Hemmes | 229/43 |
| 3,550,835 | 12/1970 | Persson | 229/32 X |
| 3,570,748 | 3/1971 | Coyle et al. | 229/53 |
| 3,615,706 | 10/1971 | Robinson | 426/113 |
| 3,619,215 | 11/1971 | Bard | 426/113 |
| 3,637,132 | 1/1972 | Gray | 426/109 |
| 3,750,827 | 8/1973 | Wick | 229/3.5 MF |
| 3,890,448 | 6/1975 | Ito | 426/106 |
| T915,001 | 10/1973 | Berkebile et al. | 264/92 |

*Primary Examiner*—Steven L. Weinstein
*Attorney, Agent, or Firm*—Amster & Rothstein

[57] ABSTRACT

A package capable of withstanding prolonged exposure to temperatures in excess of 300° F is formed from a composite film which includes a thermostable, thermoplastic layer and a polyolefin layer having a softening point below 300° F. The package is hermetically sealed although it may include a weakened seal area which acts as a pressure relief valve, and may be employed as a serving dish as well as a heating container.

5 Claims, 2 Drawing Figures

U.S. Patent   Dec. 14, 1976   3,997,677

HIGH TEMPERATURE RESISTANT HERMETICALLY SEALED PLASTIC TRAY PACKAGES

This is a continuation-in-part of application Ser. No. 251,711, filed May 9, 1972 and now abandoned.

This invention relates to novel laminated films and to novel packages formed from such films. More particularly, the present invention is concerned with packaging films comprising a laminate of at least one thermostable material and selected polyolefins which is useful for applications requiring exposure of a package to a wide range of temperatures.

In recent years, the sale and distribution of precooked and prepackaged foods in the frozen state has been greatly expanded. A large proportion of these convenience foods are packaged in aluminum trays which are crimp sealed with a cardboard lid or foil overwrap. This type of package has many disadvantages. For example, the crimp seal is not a hermetic seal and the package contents are, therefore, subject to spoilage and contamination. In addition, due to the physical characteristics of aluminum, it cannot be used in a microwave oven and, even in a conventional oven, the heat loss by reflection necessitates a prolonged heating period. Moreover, aluminum packages are costly and do not permit the consumer to view the quality or quantity of the package contents until the package is opened.

Although there are known plastic materials which would overcome some of the aforementioned shortcomings of aluminum, these materials present other difficulties which have prevented their substitution for aluminum as a packaging material. For example, thermosetting plastics such as melamine retain their shape when exposed to elevated temperatures but such materials require costly fabrication techniques and machinery which render them impractical for use as packaging materials. On the other hand, known thermoplastic materials which can be easily fabricated into shapes by the application of heat and pressure either lack the thermostability required for extended exposure to elevated temperatures or lack the heat-sealability and barrier characteristics which are essential for a packaging material. Thus, the use of thermoplastic materials in packaging has been limited to products which either do not require exposure to elevated temperatures, e.g. polyvinylchloride trays used in packaging cold meats, or to frozen food products which are thawed at temperatures below the known softening point of the packaging material, e.g. flexible pouches which can be exposed to boiling water to thaw the package contents.

It is an object of the present invention to provide a novel packaging film composite and hermetically sealed package for heating the products contained therein.

It is a further object of the invention to provide a film composite and packages formed therefrom capable of withstanding both freezing temperatures and the oven temperatures required for reconstitution of frozen foods.

Yet another object of the invention is to provide a semi-rigid package which will retain its shape at elevated temperatures and can be utilized as a serving tray in addition to being used as a package.

A still further object of the invention is to provide a packaging film composite which can be used with conventional forming, filling, sealing and related packaging apparatus to produce packages which can withstand elevated temperatures.

It has now been discovered that film composites comprising selected thermoplastic films can be formed into packages which will retain their shape even after prolonged exposure to elevated temperatures, for example, oven temperatures in excess of 300° F. Specifically, this invention resides in the discovery that thermoplastic films which are thermostable at temperatures in excess of 300° F. but which generally lack the heat-sealability or barrier characteristics required for a packaging film can be formed into a composite with selected polyolefins having the necessary barrier and sealability characteristics to provide packages which will withstand freezing temperatures as well as extended exposure to elevated temperatures in excess of 300° F. The discovery that such laminates may be formed into packages capable of withstanding prolonged exposure to elevated temperatures is a totally unexpected result since the polyolefins employed to form the composites have softening points well below 300° F. and persons skilled in the art would not recommend these materials for use above their softening points.

The polyolefins, which are useful in the preparation of the packaging laminate of the invention are olefin polymers and co-polymers having a softening point greater than 180° F. but less than 300° F. Materials within this definition include medium and high density polyethylene, polypropylene, polybutene and copolymers formed from one or more of the aforesaid olefins. The preferred polyolefins are medium and high density polyethylenes, i.e. polethylene polymers having a density in excess of 0.925, for example 0.930 gms./cc or greater and polypropylene.

The selection of the thermostable, thermoplastic films which will be jointed with the above-identified polyolefins to form the film composite and package of the invention is not critical provided that the material selected possesses certain functional characteristics. These characteristics include thermostability at temperatures in excess of 300° F., e.g. temperatures in the range of 300° to 450° F. for prolonged periods of time, e.g. 15 to 60 minutes or more. In addition to thermostability, the thermoplastic materials must be capable of being formed into flexible films as well as thermoformed into semi-rigid trays which will retain their shape even after prolonged exposure at elevated temperatures. Typical thermoplastic materials which have been found to be suitable for the preparation of the laminates and packages of the invention are polycarbonates, polypentamethylene homo- and co-polymers, polysulfones.

The manner in which the thermostable film and polyolefin films are fabricated and united are not critical features of the invention. Thus, the films may be fabricated separately using conventional film fabricating techniques, alternatively, either film may be extrusion coated onto the other film, or the films can be coextruded. Any of the techniques and materials which are known in the art for the purpose of uniting the film layers may be employed provided only that the materials selected can withstand exposure to elevated temperatures for prolonged periods of time without delamination. Typical adhesives which may be employed for this purpose are thermosetting adhesives such as epoxies, polyurethanes and cross-linked polyesters. The selection of a particular adhesive will, of course, depend upon the specific polyolefin and thermostable film being laminated and the selection of an appropriate adhesive can be readily made by persons of ordinary skill in the lamination art.

The thicknesses of the various layers of material are not critical features of the invention and will be selected in accordance with techniques which are well known in the art. For obvious economic reasons the guages will ordinarily be the minimum thickness required to achieve the desired performance characteristics of the package, i.e. thermo-stability, sealability, rigidity or flexibility and the like. Moreover, in some instances, it may be desirable to employ multiple layers of different thermostable films in forming the film composite.

Figure 2:
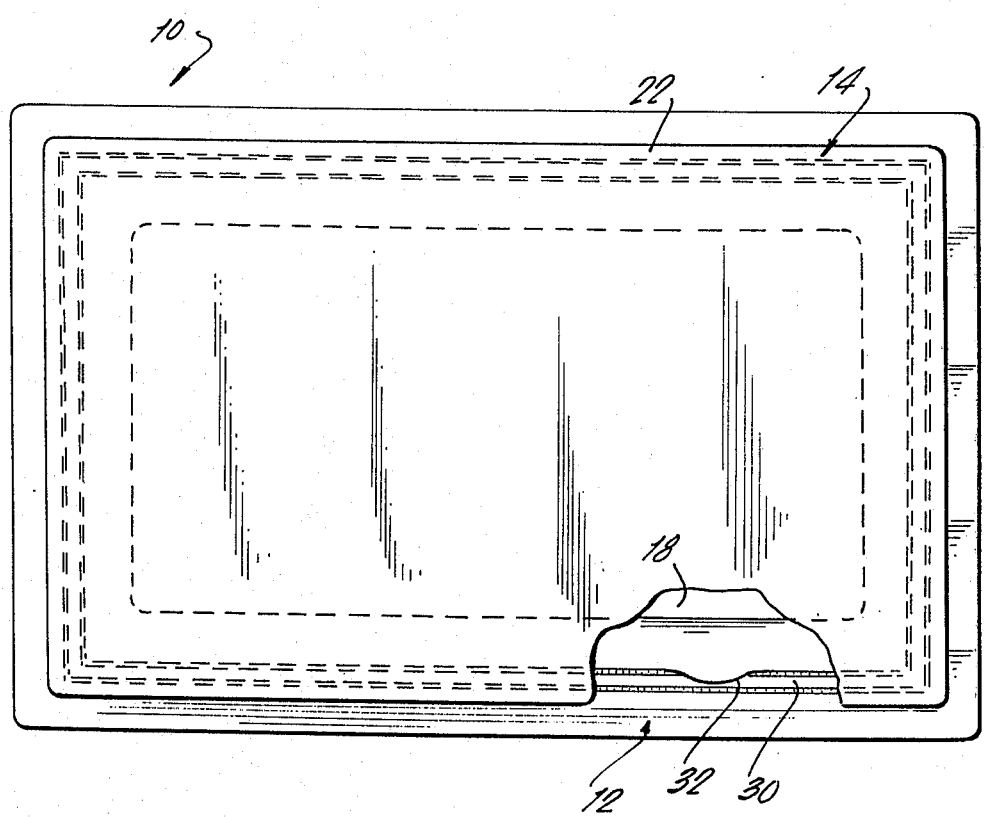

The above description as well as further objects, features and advantages of the present invention will become apparent from the consideration of the following detailed description of presently preferred embodiments when taken in conjunction with the accompanying drawings, wherein:

FIG. 1 is a cross-sectional view of a package embodying the present invention; and FIG. 2 is a top view of the package illustrated in FIG. 1.

Referring to FIG. 1, the package generally designated by the reference numeral 10, comprises a preformed tray 12 and a lid 14. Although the tray as shown is rectangular in shape, a variety of shapes may be employed. Moreover, although the package illustrated in FIG. 1 includes a semi-rigid tray, the packages of the invention may be made from fully flexible materials in which one or more portions of the laminate are joined using packaging equipment and techniques which are well known in the art.

Tray 12 is formed of a laminate comprising as an outer layer, a thermostable film 16 and, as an inner layer, a polyolefin 18, both as previously described. These layers are joined by a suitable adhesive 20.

The lid 14 includes an outer layer 22 formed from a thermostable film and inner layer 24 of polyolefin and a suitable adhesive 26 joining the inner and outer layer. Ordinarily the lid will be designed to be more flexible than the tray in order to avoid excessive stiffness and to enable the package to be opened with less difficulty.

The arrangement as shown in FIG. 1 provides for the hermetic sealing of the contents of the package 28 by virtue of peripheral heat seal 30 which joins polyolefin layer 18 of tray 12 with polyolefin layer 24 of lid 14. A similar peripheral heat seal between facing polyolefin layers will be formed when a package is formed from flexible materials or in shapes other than that illustrated in FIG. 1.

The package illustrated in FIG. 1 may be subjected to freezing temperatures in order to freeze the contents of the package and thereafter may be exposed to oven temperatures as previously described to reconstitute and heat the food product. Moreover, when the lid 14 is removed, the tray 12 may actually function as a serving dish for the food product contained therein.

FIG. 2 illustrates a further feature of the invention in which a weakened heat seal area 32 is provided in heat seal 30. It has been discovered that when frozen foods are reheated at oven temperatures in a hermetically sealed package, a buildup of steam and hot air within the package may occur. Such a buildup could result in an undesirable rupture and possible injury to the consumer. By suitable modification of a conventional sealing bar, the heat seal 30 which joins lid 14 to tray 12 may be provided with a weakened area, i.e., an area of reduced width. In the event of stress induced by internal pressure which develops during the heating cycle, this weak seal area 32 will fail thereby acting as a safety or pressure relief valve.

The invention will be further understood by reference to the following illustrative examples.

EXAMPLE 1

A semi-rigid composite film was prepared from 0.010 inch thick polycarbonate film commercially available from General Electric under the trade name Lexan. This film was coated with an epoxy adhesive sold under the trade name EPS 505 by American Herberts Corp. Approximately 1500 grams of the adhesive were applied to one surface of 3,000 square feet of Lexan. The wet coating was dried at 300° F. in a high air velocity oven and was then laminated with heat and pressure to a 0.002 inch thick medium density polyethylene film sold by Visqueen Corporation under the trade designation C10-102.

EXAMPLE 2

The composite of Example 1 was prepared with one exception. In place of the medium density polyethylene of Example 1, was substituted a 0.002 inch thick modified high density polyethylene film as commercially available from Phillips Joanna under the trade designation Philjo 600W.

EXAMPLE 3

The composite of Example 1 was prepared with one modification. In place of medium density polyethylene film, a 0.0015 inch thick film of polypropylene was substituted. The preferred polypropylene was furnished by Avisun under the trade designation AT-36.

EXAMPLE 4

A composite was prepared from a 0.015 inch thick film of polypentamethylene. This film was cast from resin commercially available from Imperial Chemical Industries, Ltd. A polyurethane adhesive commercially available from Midland Dexter Corp. under the designation Micobond 80X107 was coated onto the film. Adhesive application was in the range of 450 to 1200 grams per 3,000 square feet of surface. The adhesive was dried and a 0.002 inch thick polypropylene film was laminated to the adhesively coated polypentamethylene film with the aid of heat and pressure.

EXAMPLE 5

A composite was formed as described in Example 4, except that a modified high density polyethylene film was substituted for the medium density polyethylene film.

EXAMPLE 6

A 0.018 inch thick polysulfone film as furnished by Union Carbide was laminated with the aid of the adhesive of Example 4 to a 0.0015 inch thick high density polyethylene film.

EXAMPLE 7

A 0.0015 inch thick polypentamethylene film was laminated with the aid of the adhesive of Example 1 to a 0.002 inch thick polypropylene film.

EXAMPLE 8

A 0.002 inch thick polysulfone film was laminated with the aid of the adhesive of Example 1 to a 0.002 inch thick medium density polyethylene film.

EXAMPLE 9

A 0.002 inch thick polycarbonate film was laminated with the aid of the adhesive of Example 1 to a 0.0015 inch thick polypropylene film.

Thermally stable packages were prepared from at least one and no more than two laminates selectively chosen from the laminates described in Examples 1 to 9. These packages can be exposed to and impinged upon by high energy such as emanating from steam tables, microwave ovens, or conventional radiation and convection ovens. The packages thus exposed retain their integrity while the content, absorbing energy, is brought to an elevated temperature level. Thus, even frozen food can be heated to edible temperatures without ill effect to the packaging material. Unexpectedly, it was found that food can be heated in the package of the invention much more rapidly than is generally possible in more conventional aluminum trays. For example, T.V. Dinners are sold in foil packages with instructions to heat at 375° F. to 400° F. for up to thirty minutes. It has been found that the equivalent product packaged in the package of the invention can be reconstituted to palatable temperatures in about 10 minutes.

The following examples illustrate the use of the above described films in packages.

EXAMPLE 10

A semi-rigid tray was formed on a 6-14 Flex Vac packaging machine from a composite of polycarbonate-polypropylene as prepared in Example 3. Into this tray was placed a pastrami sandwich. The tray was covered with the composite as prepared in Example 9 and this lid was sealed to the tray while the air within the package was replaced with nitrogen. The package was frozen and stored in a freezer at 10° F. for four weeks. At the end of the storage period, the sandwich package was taken from the freezer and placed in a microwave oven. After exposure for two minutes to high frequency energy, the sandwich was hot and tasty.

EXAMPLE 11

Pouches were formed from a polypentamethylene-polypropylene composite, such as the one prepared in Example 7, utilizing conventional equipment. These pouches were filled with cocktail franks, evacuated and sealed. Some of these pouches were frozen while others were refrigerated. Both frozen and refrigerated cocktail franks were heated in a microwave oven, a gas fired convection oven, and in boiling water and in each case, the franks were brought to the desired temperature in relatively short time without package failure or other difficulties.

Having thus described the general nature of the invention as well as specific examples thereof, the true scope will now be pointed out in the appended claims.

What is claimed is:

1. A hermetically sealed plastic package for use at temperatures above 300° F. comprising a semi-rigid tray member and a flexible lid member sealed together to form a cavity between them, an article to be heated to temperatures above 300° F. in said cavity, said tray member and said lid member each being formed from a laminate film and each member comprising an outer thermoplastic film layer selected from the group consisting of polycarbonate, polypentamethylene homo- and co-polymers and polysulfone films and an inner polyolefin film layer, said thermoplastic film layer being thermostable at temperatures above 300° F., said polyolefin film layer having a softening point greater than 180° F. but less than 300° F., a hermetic seal between the polyolefin film layer of said tray member and the polyolefin film layer of said lid member, said package being capable of withstanding exposure to a temperature in the range of 300° F. to 450° F. for a period of at least 15 minutes without losing its shape or its integrity.

2. The package of claim 1 wherein said polyolefin film is a medium density polyethylene having a density greater than 0.925 gms./cc.

3. The package of claim 1 wherein said polyolefin film is polypropylene.

4. The package of claim 1 wherein the seal is formed between the polyolefin layer of said tray and the polyolefin layer of said lid around the outer periphery of said tray.

5. The package of claim 4 further including a pressure relief valve, said pressure relief valve comprising a seal area which is weaker than the surrounding seal area.

* * * * *